(12) United States Patent  (10) Patent No.: US 8,376,079 B2
Ito  (45) Date of Patent: Feb. 19, 2013

(54) MOTORCYCLE

(75) Inventor: Shinji Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 510 days.

(21) Appl. No.: 12/393,626

(22) Filed: Feb. 26, 2009

(65) Prior Publication Data

US 2009/0229908 A1  Sep. 17, 2009

(30) Foreign Application Priority Data

Mar. 12, 2008 (JP) ................................. 2008-062044

(51) Int. Cl.
*B62K 11/02* (2006.01)

(52) U.S. Cl. ........................................ 180/226; 180/227

(58) Field of Classification Search .................. 180/219, 180/227, 228, 229, 226, 230
See application file for complete search history.

(56) References Cited

U.S. PATENT DOCUMENTS

| 4,336,859 A | 6/1982 | Leitner | |
| 4,436,173 A * | 3/1984 | Takahashi | 180/226 |
| 4,664,215 A * | 5/1987 | Suzuki et al. | 180/226 |
| 6,508,326 B2 * | 1/2003 | Kido et al. | 180/226 |
| 2006/0065463 A1 | 3/2006 | Handa et al. | |
| 2007/0045024 A1 * | 3/2007 | Koistra et al. | 180/227 |
| 2007/0193806 A1 * | 8/2007 | Ito et al. | 180/227 |
| 2007/0199756 A1 * | 8/2007 | Kofuji | 180/226 |
| 2008/0066986 A1 * | 3/2008 | Ito et al. | 180/226 |
| 2008/0066987 A1 | 3/2008 | Ito et al. | |

FOREIGN PATENT DOCUMENTS

| DE | 102007043720 A1 | 4/2008 |
| IT | TO20070581 A1 | 3/2008 |
| JP | 59-30790 A | 2/1984 |
| JP | 2006-096274 A | 4/2006 |

* cited by examiner

*Primary Examiner* — Anne Marie M Boehler
(74) *Attorney, Agent, or Firm* — Birch, Stewart, Kolasch & Birch, LLP (57) ABSTRACT

In a motorcycle in which a rear fork is swingably provided on a vehicle body frame with a power unit, a rear wheel is provided at a rear end of the rear fork, a drive shaft is provided between a gear case on a lateral side of the rear wheel and an output shaft of the power unit, and output power of the power unit is transmitted to the rear wheel through the drive shaft and the gear case. The rear fork extends along a lateral side of the rear wheel and has an arm through which the drive shaft passes. The arm has a tubular base part with a closed cross section, and a rear part with an open cross section through which the drive shaft passes. The base part has a thick-walled area at the rear end of the base part.

18 Claims, 9 Drawing Sheets

MOTORCYCLE

CROSS-REFERENCE TO RELATED APPLICATION

The present application claims priority under 35 U.S.C. §119 to Japanese Patent Application No. 2008-062044, filed Mar. 12, 2008, the entire contents of which are hereby incorporated by reference.

BACKGROUND OF THE INVENTION

1. Field of the Invention

The present invention relates to a motorcycle with a drive shaft.

2. Description of Background Art

Generally a motorcycle has been known in which a rear fork is swingably provided on a body frame with a power unit, a rear wheel is provided at the rear end of the rear fork, and a drive shaft is provided between a gear case provided on a lateral side of the rear wheel and the power unit's output shaft to transmit output power of the power unit to the rear wheel through the drive shaft and gear case (for example, see JP-A No. 2006-96274).

In this type of motorcycle, the rear fork has a pair of left and right arms and each arm is a tube with a closed cross section.

However, in the above conventional structure, when the drive shaft is located inside one arm, the one arm must have a larger cross section than the other arm; in this case, it is necessary to increase the strength of the rear fork and reduce its weight while optimizing the rigidity balance.

SUMMARY AND OBJECTS OF THE INVENTION

Therefore, an object of the present invention is to solve the above problem of the related art and provide a motorcycle which optimizes the rigidity balance and also has a stronger and lighter rear fork.

In order to solve the above problem, an embodiment of the present invention includes a motorcycle in which a rear fork is swingably provided on a vehicle body frame with a power unit, a rear wheel is provided at the rear fork's rear end, a drive shaft is provided between a gear case on a lateral side of the rear wheel and the power unit's output shaft, and output power of the power unit is transmitted to the rear wheel through the drive shaft and the gear.

The rear fork extends along a lateral side of the rear wheel and has an arm through which the drive shaft is passed and the arm has a tubular base part with a closed cross section and a rear part with an open cross section through which the drive shaft is passed, and the base part has a thick-walled area at its rear end.

In this structure, the rigidity balance can be optimized by using the arm's tubular base part with a closed cross section and its rear part with an open cross section. This can improve steerability. Besides, regarding the arm, the thick-walled area is provided at the rear end of the base part, or the point of change from the closed cross section to the open cross section, and the wall thickness of the rest is smaller, so that the area of stress concentration can be strong and the weight of the rear fork can be reduced.

In an embodiment of the present invention, it is preferable that the closed cross section of the base part of the arm be square and the wall thickness of its corners be the largest.

In this structure, since the corners of the square cross section of the arm are the thickest and the rest is thinner, the area of stress concentration can be strong and the weight of the rear fork can be reduced.

Moreover, in an embodiment of the present invention, it is preferable that the rear part of the arm be open on an inner side in its width direction and the gear case be located in its open area and the drive shaft be passed in the arm.

In this structure, though the cross section of the arm must be large enough since the drive shaft is passed in the arm, the rear part of the arm has an open area open on the inner side in the width direction, the gear case can be located in the open area and the rigidity balance can be optimized and the weight of the rear fork can be reduced.

Effects of the invention include the following:

According to an embodiment of the present invention, the rigidity balance can be optimized by using the arm's tubular base part with a closed cross section and its rear part with an open cross section. This can improve steerability. Besides, in the arm, the thick-walled area is provided at the rear end of the base part, or the point of change from the closed cross section to the open cross section, and the wall thickness of the rest is smaller, so that the area of stress concentration can be strong and the weight of the rear fork can be reduced.

Furthermore, since the corners of the square cross section of the arm are the thickest and the rest is thinner, the area of stress concentration can be strong and the weight of the rear fork can be reduced.

Furthermore, though the cross section of the arm must be large enough since the drive shaft is passed in the arm, the rear part of the arm has an open area open on the inner side in the width direction, the gear case can be located in the open area and the rigidity balance can be optimized and the weight of the rear fork can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
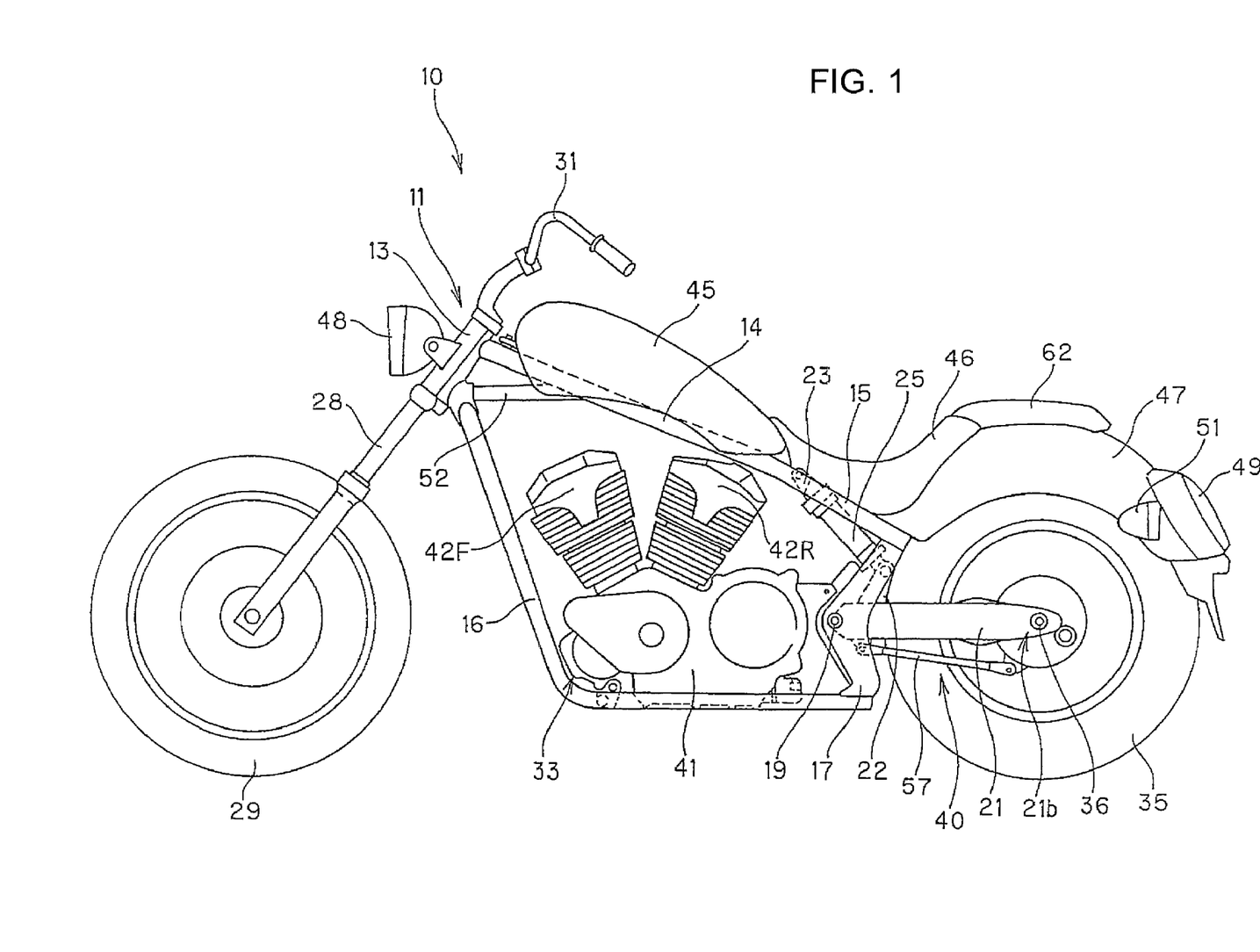
FIG. 1 is a left side view of a motorcycle according to an embodiment of the present invention.

FIG. 1 is a left side view of a motorcycle according to an embodiment of the present invention. In the explanation given below, direction-related words such as "front", "rear (back)", "left", "right", "up (or above)" and "down (or below)" refer to directions with respect to the vehicle body.

The body frame 11 of a motorcycle 10 includes: a head pipe 13 located at the front of the vehicle body; a main frame 14 extending rearward from the head pipe 13; a pair of left and right seat rails 15 extending rearward from the rear end of the main frame 14; a pair of left and right down frames 16 extending rearward and obliquely downward from the head pipe 13; and a pair of left and right rear frames 17 which connect the rear ends of the down frames 16 with the rear ends of the seat rails 15 so that these virtually form a quadrilateral frame as viewed sideways.

A front fork 28 is rotatably fitted to the head pipe 13 and a front wheel 29 is rotatably supported on the lower end of the front fork 28. Also a steering handlebar 31 is fitted to the top of the front fork 28. A headlight 48 is provided in front of the head pipe 13. A gusset member 52 for reinforcing the body frame 1 is provided under the head pipe 13.

An engine (power unit) 33 is located in a space surrounded by the main frame 14, down frames 16 and rear frames 17. The engine 33 is a 2-cylinder V engine which includes a crankcase 41 and two cylinder parts 42F and 42R standing from the crankcase 41. A fuel supply unit, an exhaust pipe, a muffler and so on are omitted in the figure.

A pivot shaft 19 is rotatably fitted to the middle of the rear frame 17 in the vertical direction and the rear fork 21 is vertically swingably fitted to the pivot shaft 19. A rear cushion unit 25 which connects the front part 22 of the rear fork 21 and the rear part 23 of the main frame 14 absorbs impact on the rear fork 21. A rear wheel 35 is rotatably supported through a rear wheel axle 36 at the rear end 21b of the rear fork 21. A shaft drive device 40 is located between the rear wheel axle 36 and the engine 33 and rotary power from the engine 33 is transmitted through the shaft drive device 40 to the rear wheel 35.

A fuel tank 45 is mounted above the main frame 14 in a way to cover the upper part of the engine 33. A rider seat 46 is located behind the fuel tank 45 and the rider seat 46 is supported by the seat rails 15.

Figure 2:
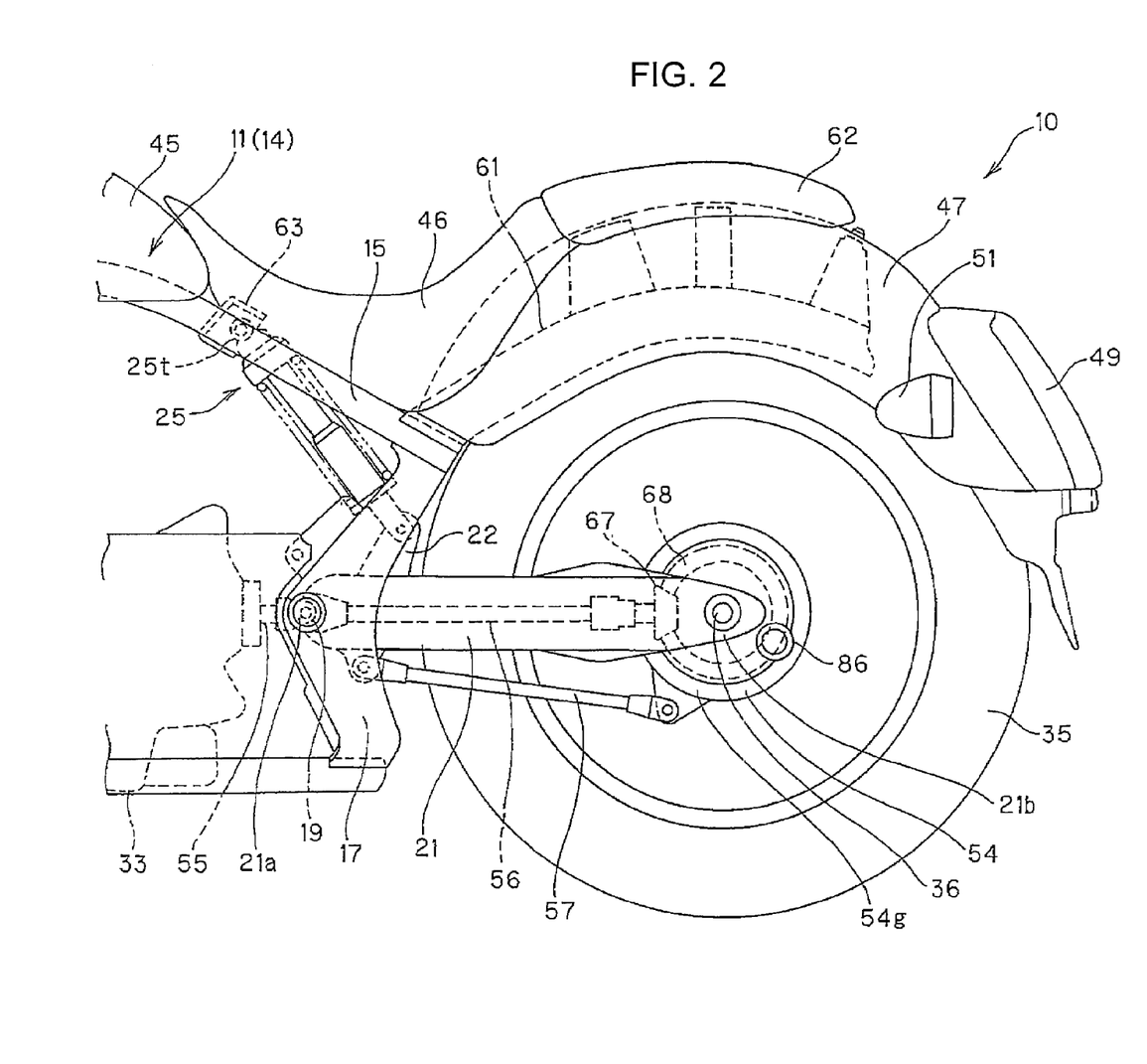
FIG. 2 is a left side view of the rear part of the motorcycle according to the present invention.

FIG. 2 is a left side view of the rear part of the motorcycle 10.

The motorcycle 10 includes a gear case 54 provided on a lateral side of the rear wheel 35 and a drive shaft 56 provided between the gear case 54 and the engine 33's output shaft 55 where output power of the engine 33 is transmitted through the drive shaft 56 and gear case 54 to the rear wheel 35.

The gear case 54 is supported on the rear wheel axle 36 located at the rear end 21b of the rear fork 21 and a torque rod 57 which connects the periphery 54g of the gear case 54 and the rear fork 21 prevents the gear case 54 from turning.

A rear frame 61 extending rearward is provided at the rear end of the seat rail 15, and a rear fender 47 for covering the upper part of the rear wheel 35 and a pillion 62 are fitted to the rear frame 61. A tail light 49 and a pair of left and right rear winkers 51 are fitted to the rear end of the rear fender 47. A bracket 63 is located behind the main frame 14 and the top 25t of a rear cushion unit 25 is held on this bracket 63.

Figure 3:
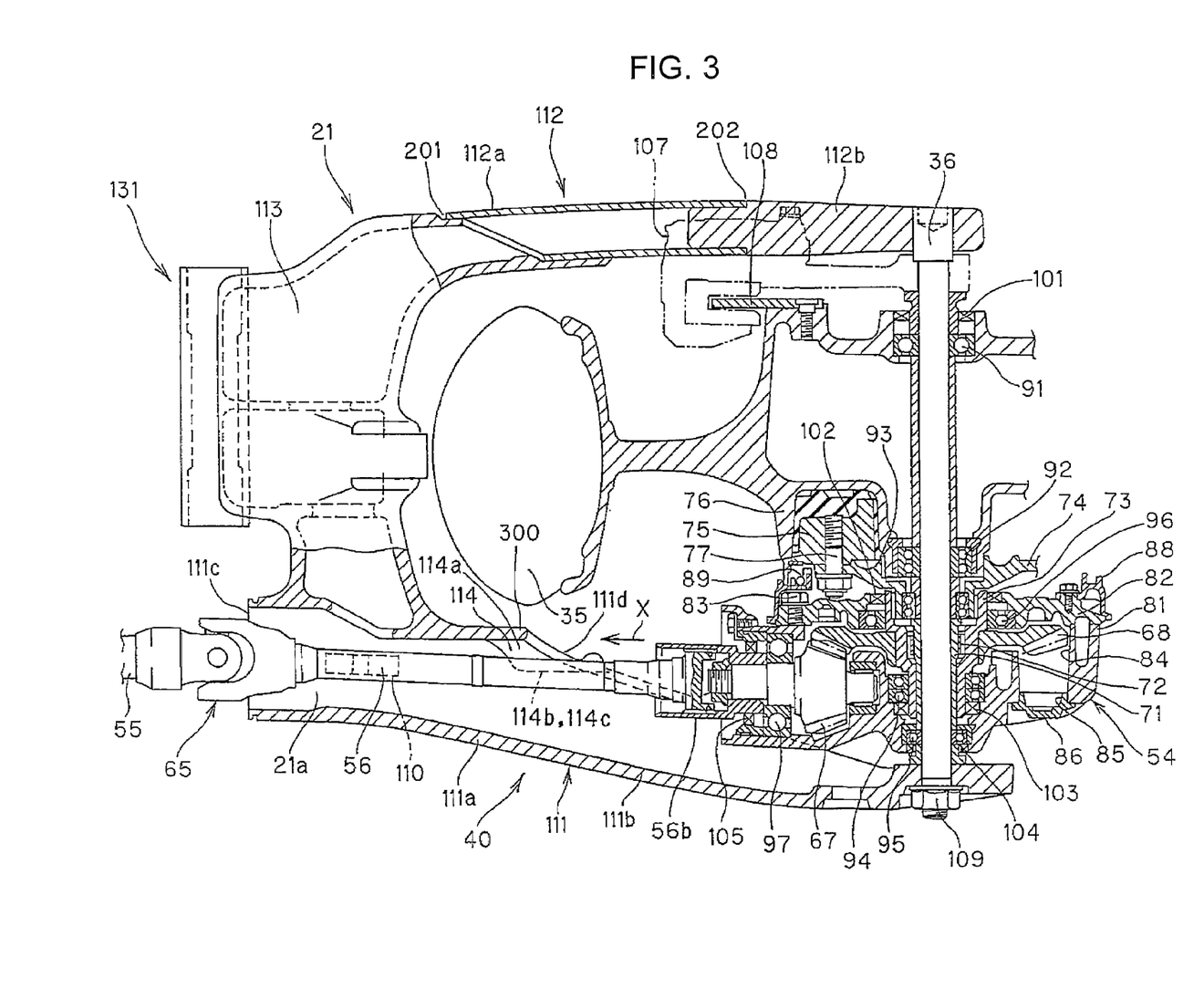
FIG. 3 is a plan view of a horizontal cross section of the shaft drive device and its vicinity according to the present invention.

FIG. 3 is a plan view of a horizontal cross section of the shaft drive device 40 and its vicinity.

The shaft drive device 40 includes the drive shaft 56 fitted through a universal joint 65 to the output shaft 55 of the engine 33 (FIG. 1), a drive gear 67 fitted to the rear end 56b of the drive shaft 56, a final driven gear 68 engaged with the drive gear 67 to change the direction of driving power, and a gear case 54 for housing the drive gear 67 and the final driven gear 68 and it is supported by the rear fork 21.

The drive gear 67 on the drive side is rotatably supported through a bearing 97 inside the gear case 54 and is engaged with the final driven gear 68 on the driven side provided on the rear wheel axle 36. This final driven gear 68 is pressure-fitted into a sleeve 73 and this sleeve 73 is rotatably supported on the rear wheel axle 36 through bearings 94 and 96. A damper retainer 74 is fitted to the sleeve 73 and the damper retainer 74 is rotatably supported on the rear wheel axle 36 through a bearing 93 and rotates together with the sleeve 73. A damper member 75 as a shock absorber is fitted to the damper retainer 74 through a bolt 77. This damper member 75 transmits the torque of the drive shaft 56 through a hub 76 to the rear wheel 35 and reduces a shock caused by torque variation.

The hub 76 is rotatably supported on the rear wheel axle 36 through bearings 91 and 92. The rear wheel axle 36 is fixed on the rear fork 21 with a nut 109. A bearing 72 is located on the periphery of the rear wheel axle 36 through spacer 71. The gear case 54 is supported by the bearing 72 and another bearing 95.

In this structure, driving power transmitted from the engine 33 to the output shaft 55 is transmitted to the drive shaft 56 through the universal joint 65 and further transmitted from the drive gear 67 to the final driven gear 68. The driving power transmitted to the final driven gear 68 is transmitted through the sleeve 73, damper retainer 74, damper member 75 and hub 76 in the order of mention to drive the rear wheel 35.

The gear case 54 includes a main body part 81 and a cover part 82 which covers the main body part 81 from inside the vehicle body toward its outside. The main body part 81 is joined to the cover part 82 and they are fixed with a fastening member 83. A gear chamber 84 is formed inside the gear case 54 and the drive gear 67 and the final driven gear 68 engaged with the drive gear 67 are located in the gear chamber 84.

The gear chamber 84 is hermetically sealed with seal members 101 to 105. Also the gear chamber 84 has an oil injection hole 85 and an adequate amount of lubricating oil is injected through this oil injection hole 85. The oil injection hole 85 is usually plugged with a cap 86.

A ring member 88 as a dust guard plate is fitted to the cover part 82 from its inside. A breather tube 89 which communicates the gear chamber 84 with the air is fitted on the ring member 88. 107 denotes a disc brake unit and 108 denotes a disc brake plate.

Figure 4:
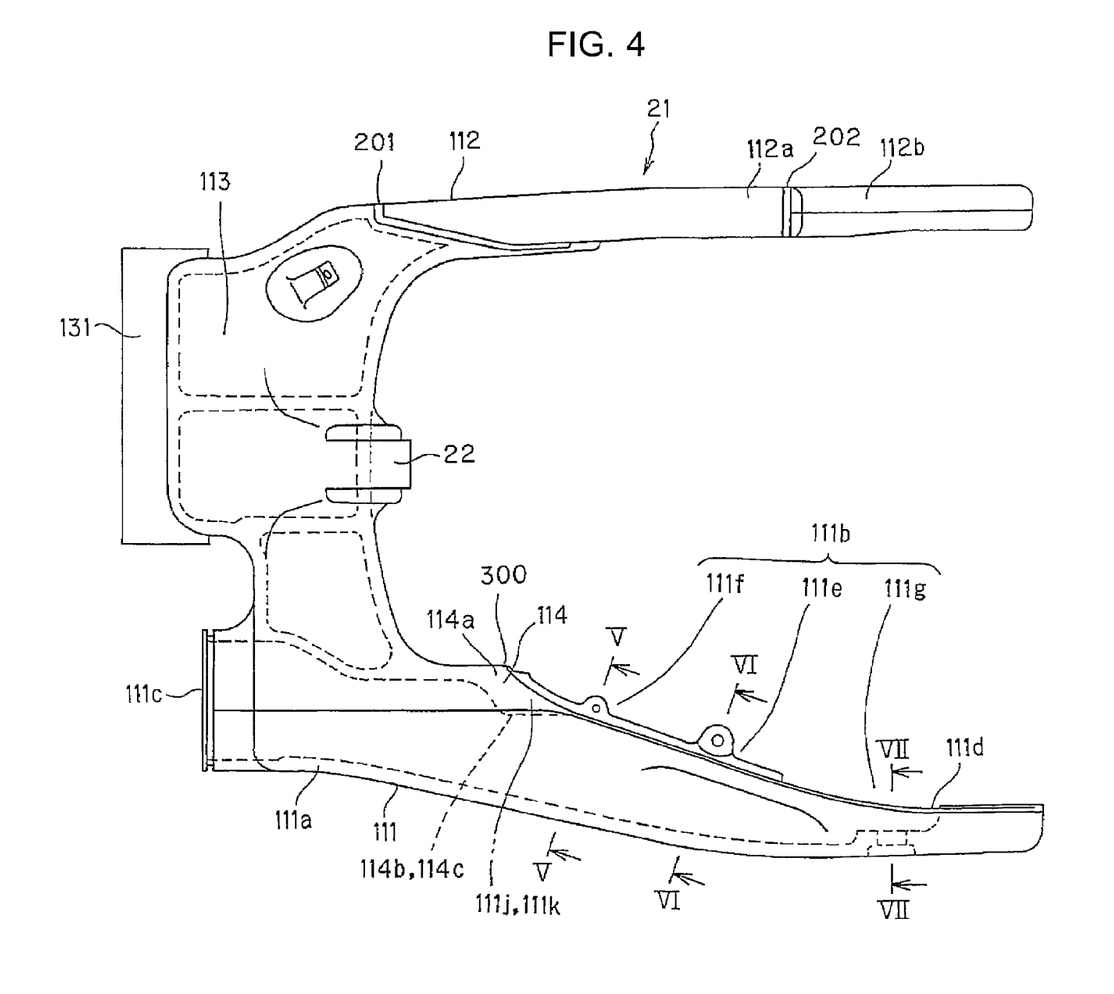
FIG. 4 is a plan view of the rear fork according to the present invention.
Figure 5:
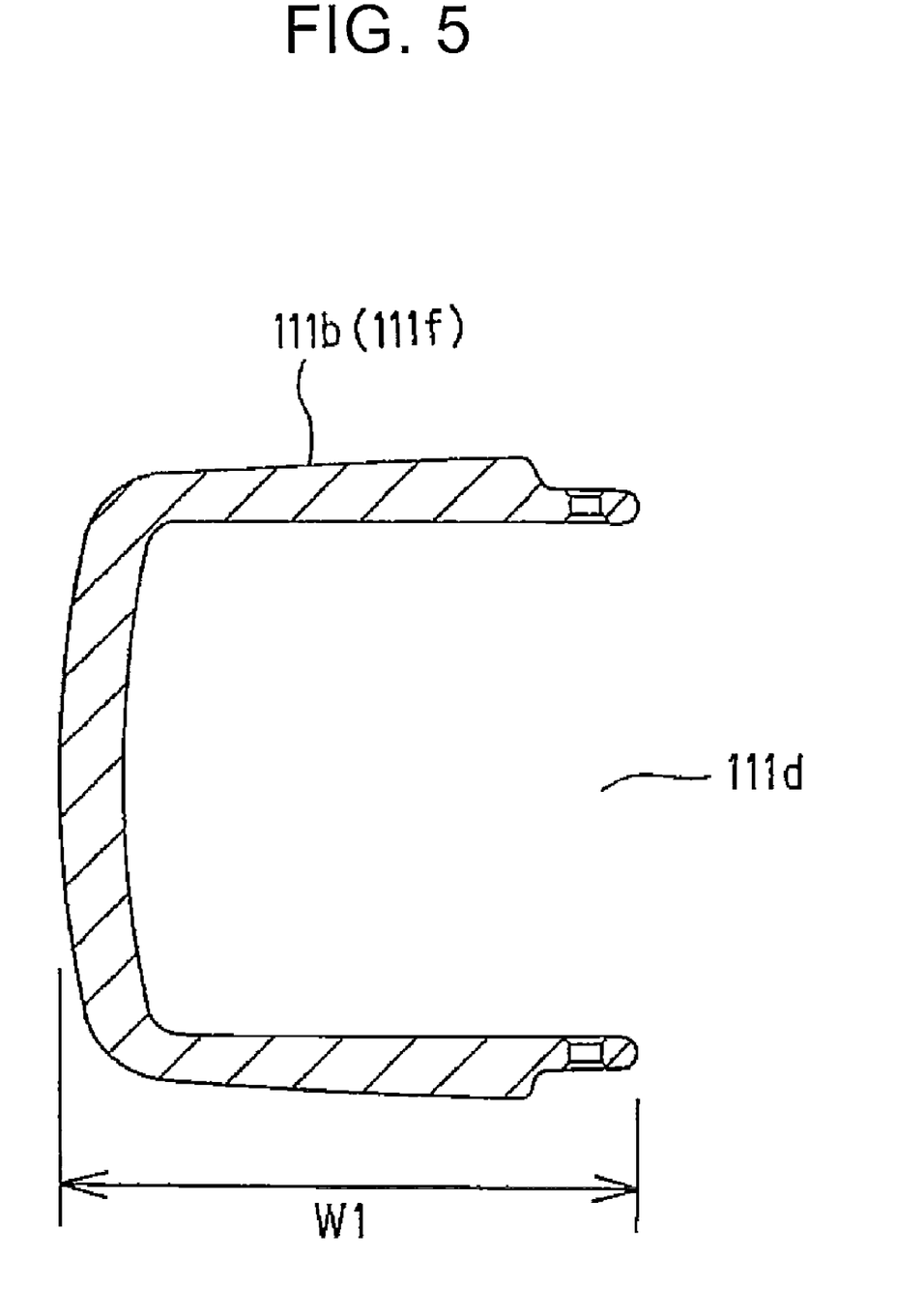
FIG. 5 is a sectional view taken along the line V-V in FIG. 4.
Figure 6:
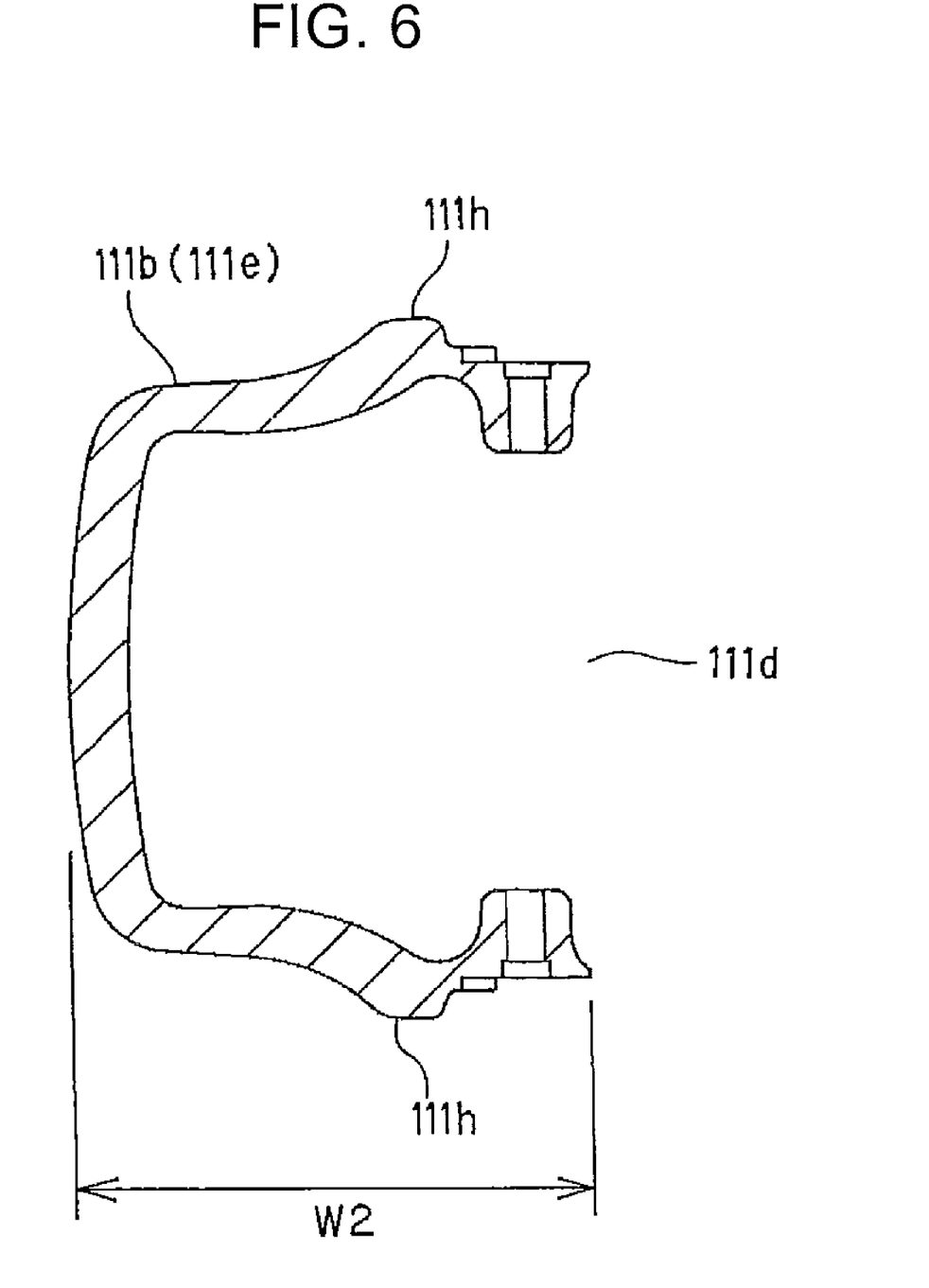
FIG. 6 is a sectional view taken along the line VI-VI in FIG. 4.
Figure 7:
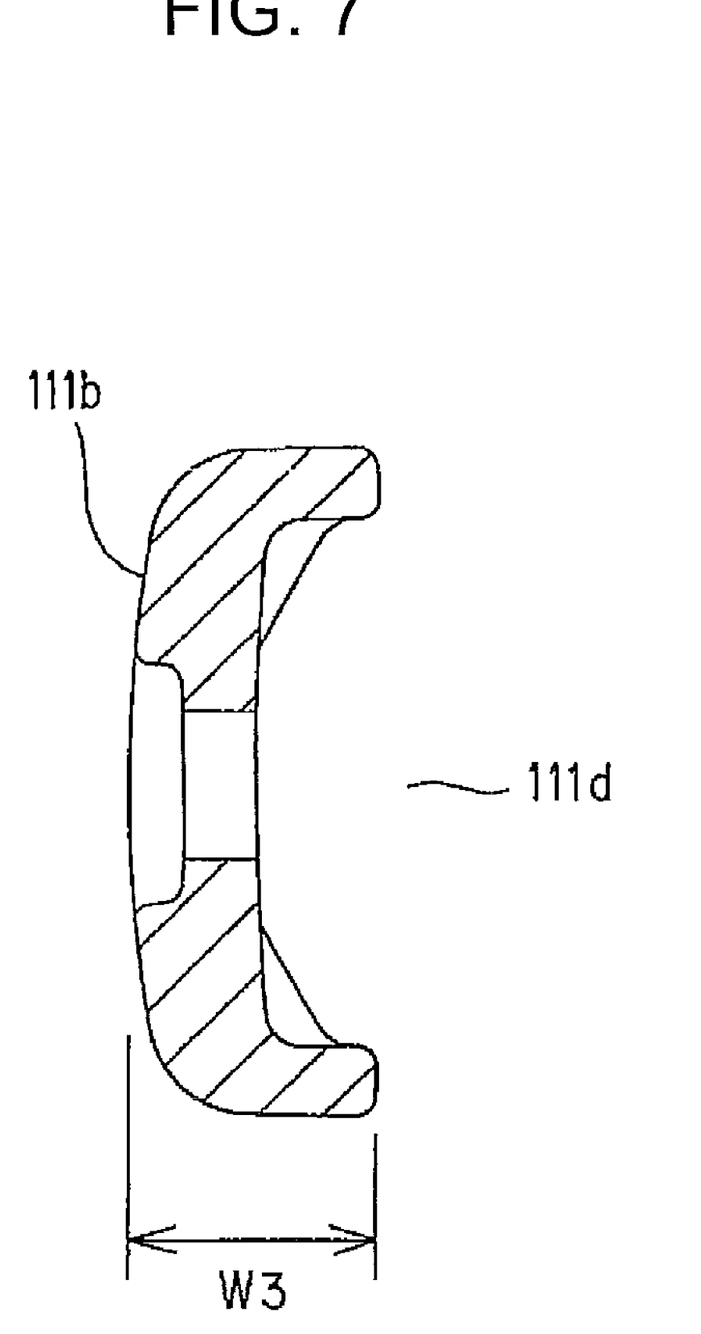
FIG. 7 is a sectional view taken along the line VII-VII in FIG. 4.
Figure 8:
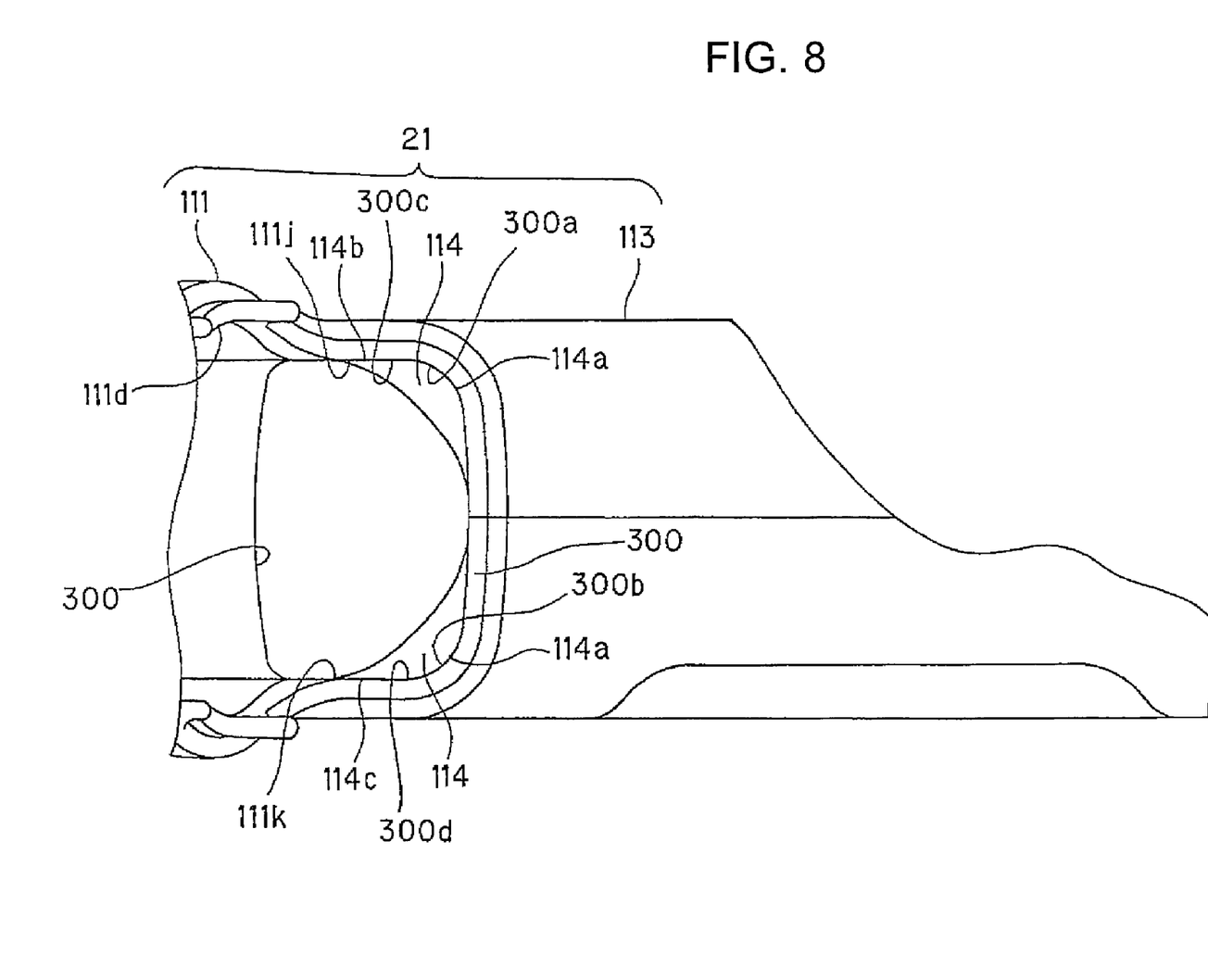
FIG. 8 is a front view showing the rear fork as seen from direction X in FIG. 3.

FIG. 4 is a plan view of the rear fork 21; FIG. 5 is a sectional view taken along the line V-V in FIG. 4; FIG. 6 is a sectional view taken along the line VI-VI in FIG. 4; FIG. 7 is a sectional view taken along the line VII-VII in FIG. 4; and FIG. 8 is a view of the rear fork 21 as seen from direction X in FIG. 3.

The rear fork 21 is made of light alloy or the like by a method such as casting. The rear fork 21 includes a left arm 111 extending left of the rear wheel 35, a right arm 112 extending right of the rear wheel 35, and a cross member 113 which connects the left arm 111 and right arm 112.

The cross member 113 stretches transversely in the vehicle width direction and constitutes the front end 21a of the rear fork 21. A pivot pipe 131 through which the pivot shaft 19 (FIG. 1) is passed is fitted to the front end of the cross member 113. A front part 22 extending upward along the vehicle body is integrally fitted to the middle of the cross member 113 in the vehicle width direction and the rear cushion unit 25 (FIG. 1) is supported on the front part 22.

The right arm 112 takes the form of a square closed sectional pipe with an outside diameter smaller than the width of the left arm 111. The right arm 112 includes a square pipe 112a fitted to the cross member 113 side by welding 201, and a solid-core member 112b fitted at the rear of this square pipe 112a by welding 202.

The left arm 111 is formed integrally with the cross member 113 by casting.

The left arm 111 is longitudinally open and the drive shaft 56 is longitudinally inserted inside the left arm 111 as shown in FIG. 3. The left arm 111 includes a base part 111a nearer to the cross member 113 and a rear part 111b at the rear of the base part 111a.

The base part 111a is located outside the periphery of the hub 76 of the rear wheel 35 and formed as a square tube with a closed cross section and an opening 111c provided at the front end of the base part 111a is circular. The rear part 111b continuously joins the base part 111a at a point corresponding to the periphery of the hub 76 of the rear wheel 35 and the rear part 111b has an opening hid which opens its inner side in the width direction longitudinally along its entire length.

The rear part 111b, the shape of which is not uniform longitudinally, includes a front portion 111f, a middle portion 111e, and a rear portion 111g.

The cross section of the front portion 111f is U-shaped as shown in FIG. 5 where its inner side is open in the width direction and width W1 is the largest in the rear part 111b. The cross section of the middle portion 111e is U-shaped as shown in FIG. 6 where its inner side is open in the width direction and open ends 111h expand vertically. The middle portion 111e's width W2 is smaller than the front portion 111f's width W1. The cross section of the rear portion 111g is elongated U-shaped as shown in FIG. 7 where its inner side is open in the width direction and the rear portion 111g's width W3 is smaller than the middle portion 111e's width W2. The gear case 54 (FIG. 3) is located in the open area 111d of the rear part 111b.

A thick-walled area 114 for reinforcement is provided inside the rear end 300 of the base part 111a, stretching from the rear end 300 to the rear part 111b as shown in FIG. 3. Specifically, as shown in FIG. 8, the rear end 300 of the base part 111a has a square closed cross section and the thick-walled area 114 is vertically symmetrically provided inside the rear end 300.

In the thick-walled area 114, its areas corresponding to the upper and lower corners 300a and 300b of the rear end 300 are the thickest areas 114a and the surface is curved toward the upper and lower edges 300c and 300d of the rear end 300, gradually becoming thin-walled areas 114b and 114c.

The thin-walled areas 114b and 114c extend toward the upper and lower edges 111j and 111k of the front portion 111f, as shown in FIG. 4.

Figure 9:
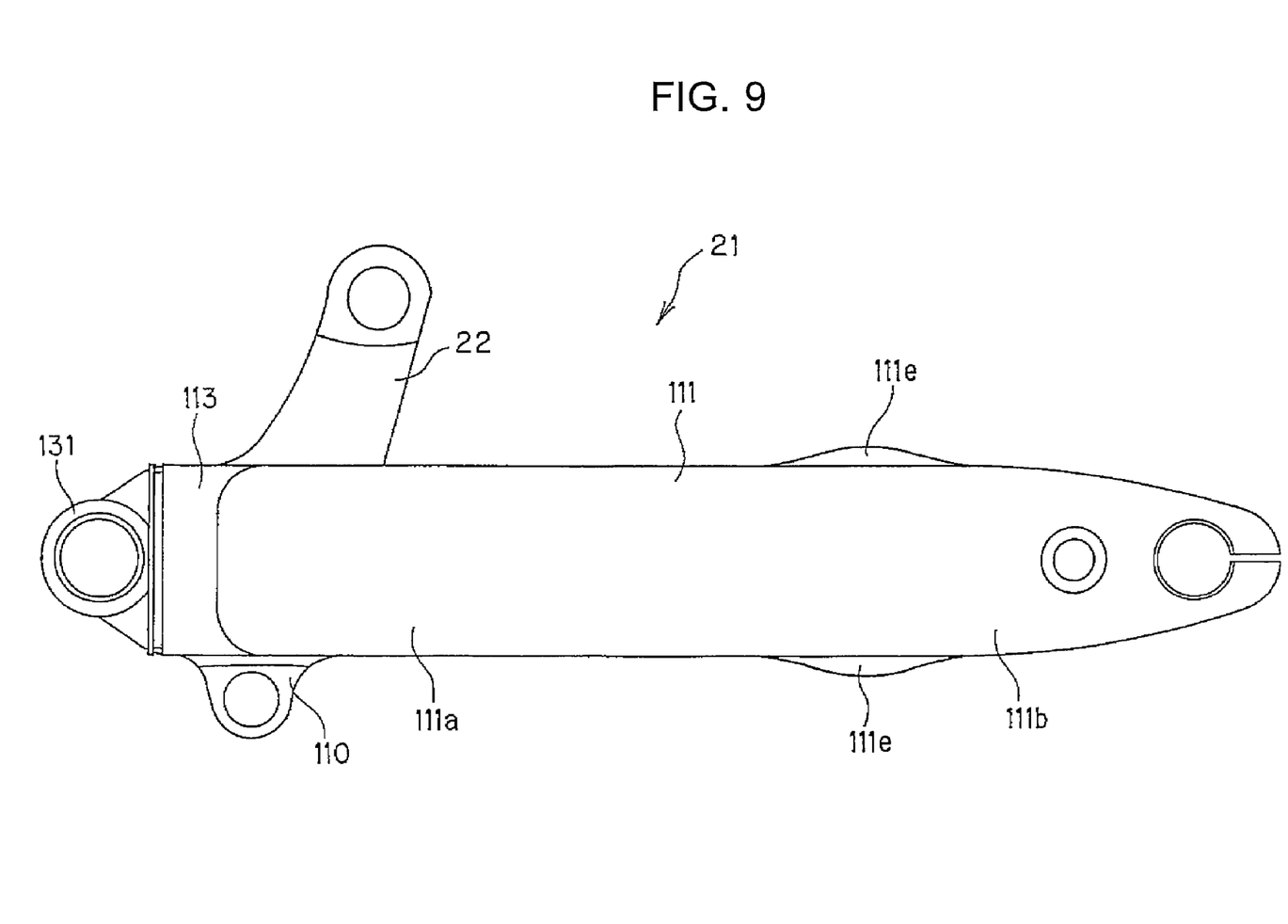
FIG. 9 is a left side view of the rear fork according to the present invention.

FIG. 9 is a left side view of the rear fork 21.

A torque rod support 110 for supporting the torque rod 57 (FIG. 2) is integrally provided on the bottom of the cross member 113.

According to this embodiment, the left arm 111 has a larger sectional area than the right arm 112 because the drive shaft 56 is inserted through it. Therefore, if the left arm 111, which has a larger shape, should have a closed cross section, the rigidity of the rear fork 21 would be too high. In case of the rear fork 21 in this embodiment, the rear fork 21's rigidity gradually decreases rearward since the base part 111a of the left arm 111 is a tube with a closed cross section and its rear part 111b has an open cross section.

In addition, since the rear part 111b has an open area 111d which opens its inner side in the width direction, the gear case 54 can be located in the open area 111d.

Furthermore, since this open area 111d is open only on the inner side of the closed cross section in the width direction, the left arm 111 and cross member 113 are easily united by casting without complicating the structure of the left arm 111.

Since the rear fork 21 in this embodiment has a thick-walled area 114 at the rear end 300 of the base part 111a, the strength of the left arm 111 can be increased, thereby suppressing concentration of stress on the rear end 300, or the point of change from the closed cross section to the open cross section.

The thick-walled area 114 at the stress concentration point makes it possible that the wall thickness of the other areas is smaller and the weight of the rear fork 21 is reduced. The thick-walled area 114 is formed as smooth arches in the pair of upper and lower corners 300a and 300b on the inner side in the width direction, in a way to get round the drive shaft 56 lying inside the left arm 111. Therefore, it is unnecessary to alter the positions and structures of the left arm 111 and drive shaft 56.

Furthermore, the gear case 54 is supported on the rear wheel axle 36 provided at the rear end 21b of the rear fork 21 and the torque rod 57 which connects the periphery 54g of the gear case 54 and the front end 21a of the rear fork 21 prevents the gear case 54 from turning. Consequently the bolts or the like which fix the gear case 54 on the middle of the rear fork 21 are not exposed, so the appearance can be improved.

Furthermore, since the front end 21a of the rear fork 21 receives power which may turn the gear case 54 during power transmission, it is unnecessary to increase the strength of the left arm 111. Therefore, the wall thickness of the left arm 111 can be decreased and as a result, the weight of the rear fork 21 can be reduced.

As described above, in this embodiment, the rigidity balance can be optimized by using the left arm 111's tubular base part 111a with a closed cross section and the rear part 111b with an open cross section. This can improve steerability. In the left arm 111, the thick-walled area 114 is provided at the rear end 300 of the base part 111a, or the point of change from the closed cross section to the open cross section, so that the corners 300a and 300b of the square cross section of the left arm 111 are the thickest and the rest is thinner and the area of stress concentration can be strong and the weight of the rear fork 21 is reduced.

In this embodiment, though the cross section of the left arm 111 must be large enough since the drive shaft 56 is passed in the left arm 111, the rear part 111b of the left arm 111 has the open area 111d open on the inner side in the width direction so that the gear case 54 can be located in the open area 111d and the rigidity balance can be optimized.

The above embodiment is one embodiment of the present invention and may be modified as appropriate without departing from the spirit and scope of the invention.

For example, although in the above embodiment the drive shaft 56 and gear case 54 are located on the left side of the rear wheel 35 and the drive shaft 56 is passed through the left arm 111 and the left arm 111 is structured as mentioned above, instead it is also possible that the drive shaft 56 and gear case 54 are located on the right side of the rear wheel 35 and the drive shaft 56 is passed through the right arm 112. In this case, the right arm 111 should be structured according to the above embodiment.

In the above embodiment, the rear fork supports the rear wheel at its both rear ends in a so-called double-arm support manner but the rear fork may support the rear wheel at one end of it in a so-called single-arm support (cantilever) manner. In the latter case, the rear fork should have a single arm extending from the cross member on one side of the wheel where the drive shaft coupled with the output shaft of the engine is inserted and passed in the arm toward the rear of the vehicle body.

The drive shaft is coupled with the rear wheel through the gear case provided on one side of the rear part of the arm. The rear wheel is supported by the rear wheel axle at the rear end of the arm in a cantilever manner. This single arm should be structured almost in the same manner as the above left arm 111. In this structure, the singe-arm support rear fork offers the same effect as the above double-arm support rear fork 21.

In other words, in the single-arm support rear fork, its rigidity gradually decreases rearward since the base part of the arm is a tube with a closed cross section and its rear part has an open cross section. In addition, since the rear part has an open area which opens its inner side in the width direction, the gear case can be located in the open area.

Furthermore, since this open area is open only on the inner side of the closed cross section in the width direction, the arm and cross member are easily united by casting without complicating the arm structure.

Since the single-arm support rear fork has a thick-walled area at the rear end of the base part, the strength of the arm can be increased, thereby suppressing concentration of stress on the rear end, or the point of change from the closed cross section to the open cross section.

The thick-walled area is formed as smooth arches in the pair of upper and lower corners on the inner side in the width direction, in a way to get round the drive shaft lying in the arm, so it is unnecessary to alter the positions and structures of the arm, drive shaft and so on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle in which a rear fork is swingably provided on a vehicle body frame with a power unit,
   a rear wheel is provided at a rear end of the rear fork,
   a drive shaft is provided between a gear case provided on a lateral side of the rear wheel and
   an output shaft of the power unit, and output power of the power unit is transmitted to the rear wheel through the drive shaft and the gear case,
   wherein the rear fork extends along a lateral side of the rear wheel and has an arm through which the drive shaft is passed and the arm has a tubular base part with a closed cross section and a rear part with a U-shaped, open cross section which opens in a width direction, and the base part has a thick-walled area at a rear end thereof, the thick-walled area being provided at upper and lower corners of an inner side of the rear end of the base part, so that an area of stress concentration can be strong and a weight of the rear fork can be reduced,
   wherein the drive shaft passes through the U-shaped, open cross section of the rear part, and the gear case is located between the rear wheel and the rear part of the rear fork in a manner such that a front portion of the gear case extends into the U-shaped, open cross section of the rear part.

2. The motorcycle according to claim 1, wherein the closed cross section of the base part of the arm is substantially square, and thicknesses of the upper and lower corners of the inner side of the rear end of the base part are greater than thicknesses of other parts of the base part.

3. The motorcycle according to claim 1, wherein the base part is located outside a periphery of a hub of the rear wheel, and is formed substantially as a square tube with a closed cross section, and includes an opening at a front end of the base part that is circular.

4. The motorcycle according to claim 3, wherein the rear part continuously joins the base part proximate a periphery of the hub.

5. The motorcycle according to claim 1, wherein the rear part of the arm has a shape which is not uniform longitudinally, and includes a front portion, a middle portion, and a rear portion.

6. The motorcycle according to claim 5, wherein the front portion of the rear part has an inner side that is open in the width direction, and a width W1.

7. The motorcycle according to claim 6, wherein the middle portion of the rear part has an inner side that is open in the width direction, open ends that expand vertically, and a width W2 that is smaller than the width W1 of the front portion.

8. The motorcycle according to claim 6, wherein the rear portion of the rear part has an inner side that is open in the width direction, and a width W3 that is smaller than the width W1 of the front portion.

9. The motorcycle according to claim 1, wherein a drive gear is fitted to a rear end of the drive shaft at a position adjacent to where the rear part of the arm is expanded vertically.

10. A motorcycle, comprising:
    a rear fork swingably provided on a vehicle body frame with a power unit;
    a rear wheel provided at an end of the rear fork;
    a drive shaft provided between a gear case provided on a lateral side of the rear wheel and an output shaft of the power unit, output power of the power unit being transmitted to the rear wheel through the drive shaft and the gear case,
    wherein the rear fork extends along both lateral sides of the rear wheel and has one arm through which the drive shaft passes,
    wherein the one arm includes:
    a tubular base part with a closed cross section,
    a rear part with U-shaped, open cross section which opens in a width direction, and
    a thick-walled area at a rear end of the base part, which is a point of change from the closed cross section to the inwardly-facing open cross section, and a wall thickness of other portions of the rear fork are smaller, so that an area of stress concentration can be strong and a weight of the rear fork can be reduced,
    wherein the drive shaft passes through the U-shaped, open cross section of the rear part, and the gear case is located between the rear wheel and the rear part of the rear fork in a manner such that a front portion of the gear case extends into the U-shaped, open cross section of the rear part.

11. The motorcycle according to claim 10, wherein the closed cross section of the base part of the one arm is substantially square, and thicknesses of upper and lower corners of an inner side of the rear end of the base part are greater than the wall thicknesses of other parts of the base part.

12. The motorcycle according to claim 10, wherein the base part is located outside a periphery of a hub of the rear wheel, and is formed substantially as a square tube with a closed cross section, and includes an opening at a front end of the base part that is circular.

13. The motorcycle according to claim 12, wherein the rear part continuously joins the base part proximate a periphery of the hub.

14. The motorcycle according to claim 10, wherein the rear part of the one arm has a shape which is not uniform longitudinally, and includes a front portion, a middle portion, and a rear portion.

15. The motorcycle according to claim 14, wherein the front portion of the rear part has an inner side that is open in the width direction, and a width W1.

16. The motorcycle according to claim 15, wherein the middle portion of the rear part has an inner side that is open in the width direction, open ends that expand vertically, and a width W2 that is smaller than the width W1 of the front portion.

17. The motorcycle according to claim 15, wherein the rear portion of the rear part has an inner side that is open in the width direction, and a width W3 that is smaller than the width W1 of the front portion.

18. The motorcycle according to claim 10, wherein a drive gear is fitted to a rear end of the drive shaft at a position where the rear part of the one arm is expanded vertically.

\* \* \* \* \*